US011680686B1

(12) United States Patent
Lei

(10) Patent No.: US 11,680,686 B1
(45) Date of Patent: Jun. 20, 2023

(54) HIGHLY WATERPROOF AND HIGHLY INSULATIVE SIMPLE PLASTIC LAMP BULB WITHOUT CONVENTIONAL LAMP CAP

(71) Applicants: Illumination Technology, Inc, Hamilton, NJ (US); Dongguan Miray E-Tech Co., Ltd, Guangdong (CN)

(72) Inventor: Jianwen Lei, Guangdong (CN)

(73) Assignee: DONGGUAN MIRAY E-TECH CO., LTD, Dongguan (CN)

( * ) Notice: Subject to any disclaimer, the term of this patent is extended or adjusted under 35 U.S.C. 154(b) by 0 days.

(21) Appl. No.: 17/654,289

(22) Filed: Mar. 10, 2022

(30) Foreign Application Priority Data

Jan. 6, 2022 (CN) .......................... 202210014214.9

(51) Int. Cl.
*F21K 9/232* (2016.01)
*F21K 9/238* (2016.01)
*F21V 31/00* (2006.01)
*F21Y 115/10* (2016.01)

(52) U.S. Cl.
CPC .............. *F21K 9/232* (2016.08); *F21K 9/238* (2016.08); *F21V 31/005* (2013.01); *F21Y 2115/10* (2016.08)

(58) Field of Classification Search
CPC . F21K 9/235; F21K 9/238; F21K 9/00; F21V 23/002; F21V 31/005; F21V 23/06; F21V 21/002; F21V 17/164; H01J 5/50; H01K 1/34; F21Y 2115/10
See application file for complete search history.

(56) References Cited

U.S. PATENT DOCUMENTS

2008/0174224 A1* 7/2008 Liao ........................ H01J 5/50
313/318.01
2015/0062929 A1* 3/2015 Mostoller ............... F21V 23/06
362/363

FOREIGN PATENT DOCUMENTS

CN 201796863 U * 4/2011
CN 110425434 A * 11/2019

OTHER PUBLICATIONS

SEARCH English translation of CN-201796863-U (Year: 2011).*
SEARCH English translation of CN-110425434-A (Year: 2019).*

* cited by examiner

*Primary Examiner* — Omar Rojas Cadima
(74) *Attorney, Agent, or Firm* — MagStone Law, LLP; Enshan Hong

(57) ABSTRACT

The present invention discloses a highly waterproof and highly insulative simple plastic lamp bulb without a conventional lamp cap, including a lampshade, a waterproof insulation plastic lamp cap, a conductive connection piece, and a lamp core body, wherein an insertion portion is provided at the bottom of the lampshade, the lamp core body is inserted into the insertion portion, the conductive connection piece is in electrical connection with the lamp core body, the conductive connection piece is disposed on the insertion portion and then integrally injection-molded into the waterproof insulation plastic lamp cap by an injection molding machine. The production process is simplified, those conventional lamp bulbs with lamp caps of various sizes are replaced, the production costs are reduced, and the daily production volume is increased.

10 Claims, 10 Drawing Sheets

HIGHLY WATERPROOF AND HIGHLY INSULATIVE SIMPLE PLASTIC LAMP BULB WITHOUT CONVENTIONAL LAMP CAP

CROSS REFERENCE TO RELATED APPLICATIONS

This application claims priority from China Patent Application No. 202210014214.9 filed on Jan. 6, 2022, the entire content of which is hereby incorporated by reference.

TECHNICAL FIELD

The present invention relates to the field of LED illumination technologies, and in particular to a highly waterproof, highly insulative, and simple plastic lamp bulb without a conventional lamp cap.

BACKGROUND

An LED lamp bulb is usually formed by assembling a lamp cap made of copper or another metal, a lampshade, and an LED lamp core. The manufacture of the LED lamp bulb is completed through multiple working procedures. In the prior art, for an LED filament bulb, a glass core column same as in an incandescent lamp is fabricated firstly, and a lamp filament is welded onto the glass core column through the semi-mechanical and semi-manual procedure so as to form an LED lamp core. Further, through a semi-mechanical and semi-manual procedure, the LED lamp core and bulb shell are conveyed into a sealing exhaust machine and then an inert gas is injected and then an exhaust tube is cut off, so as to form an unfinished LED lamp bulb. Next, a rear end of the unfinished lamp bulb is manually and fixedly mounted on the copper lamp cap to form a finished LED lamp bulb. The existing LED plastic lamp bulb is manually or semi-automatically assembled with multiple components, leading to high costs. Further, at present, the products of this industry are not waterproof, easily bringing potential safety hazards. This is a problem that has not been solved in this industry for long.

A traditional bulb is connected by a filament and a stem to form a wick, and then a lamp shell and the wick are sealed to form a semi-finished bulb. The semi-finished bulb has two electrical wires, respectively being positive and negative. To make a light bulb from this semi-finished bulb, one needs to manufacture a copper lamp holder.

The process of manufacturing the copper lamp holder is very complicated. First, a metal copper plate is punched into a spiral kit, and then a black glass or plastic injection solution is melted at high temperature and stamped at the bottom of the lamp holder, and connected with a metal positive top plate to form a positive and negative electrode insulator. After pickling and electroplating, a lamp holder is finally formed.

When the semi-finished bulb needs to connect with a lamp holder, a multi-step process is required: 1. the fixed adhesive connecting the semi-finished bulb and the lamp head is stamped in the lamp head and fixedly connected by high-temperature sintering; 2. top soldering positive power supply; 3. negative power supply wire is soldered and connected; and 4. conductivity test.

The above procedure of manufacturing the LED lamp bulb has the following problems: limited by the multi-component structure of a conventional lamp bulb, in the glass core column and sealing procedures of the above manufacturing procedures, it is required to use a high-temperature flame to achieve sintering and formation. In this case, pollution may be brought to the production environment and the workers will suffer from health harm after working in the environment for long. In a conventional plastic shell structure, there are many lamp components that are made manually, leading to tedious working procedures. Thus, tedious working procedures will be required, the costs will be greatly increased, and the product quality will become unstable. A smaller copper lamp cap means the higher difficulty of automatic production. Due to the non-waterproof property of the lamp bulb, water mist will be generated inside the lampshade, electric conduction will possibly occur, therefore increasing current and damaging electronic components. Therefore, electronic components and devices may be burned out and even electric leakage may occur, resulting in safety accidents. As a result, it is necessary to make a large improvement.

SUMMARY OF THE INVENTION

In order to solve the shortcomings of the prior art, the present invention provides a highly waterproof, highly insulative, and simple plastic lamp bulb, which features strong waterproofness, a simple structure, long service life, and no damage. An LED lamp core column may be made of glass or plastic, leading to low cost, simple processing procedure, ease of processing, the difficulty of damage, high insulation, low failure rate, large production, high waterproofness, no need for conventional lamp cap, use of less material, low production cost and low labor cost.

In order to achieve the above purpose, a technical solution of the present invention provides a highly waterproof and highly insulative simple plastic lamp bulb without a conventional lamp cap. The lamp bulb includes a lampshade, a waterproof insulation plastic lamp cap, a conductive connection piece, and a lamp core body. An insertion portion is provided at the bottom of the lampshade, and the lamp core body is inserted into the insertion portion. The conductive connection piece is in electrical connection with the lamp core body, and the conductive connection piece is disposed on the insertion portion and then integrally injection-molded into the waterproof insulation plastic lamp cap in a sealed manner by an injection molding machine. A conductive connection head is disposed on the top of the waterproof insulation plastic lamp cap, and the conductive connection piece protrudes out of the waterproof insulation plastic lamp cap.

In a further technical solution, the conductive connection piece includes an electrically conductive sleeve, a conductive head. The electrically conductive sleeve and the conductive head are in electrical connection with the lamp core body respectively. The electrically conductive sleeve is sleeved on the insertion portion, and the electrically conductive sleeve protrudes out of an outer sidewall of the waterproof insulation plastic lamp cap. The conductive head protrudes out of the top of the waterproof insulation plastic lamp cap.

In a further technical solution, the lamp core body includes a lamp core column, a first conductive wire, a second conductive wire, and at least one LED lamp filament. The lamp core column is inserted into the insertion portion, the LED lamp filament is fixedly mounted on the lamp core column. One end of the first conductive wire is in electrical connection with the LED lamp filament, and the other end of the first conductive wire is in electrical connection with the electrically conductive sleeve. One end of the second conductive wire is in electrical connection with the LED lamp filament, and the other end of the second conductive wire is in electrical connection with the conductive head.

In a further technical solution, a thread is integrally formed on the outer sidewall of the waterproof insulation plastic lamp cap, and the electrically conductive sleeve includes a lock-in part with an opening, the lock-in part is sleeved on the bottom of the insertion portion. Two end portions of the lock-in part vertically extend upward to form a wave-like conductive column matched with the thread respectively, the conductive column protrudes out of an outer sidewall of the thread, and the first conductive wire is in electrical connection with the conductive column.

In a further technical solution, the outer sidewall of the waterproof insulation plastic lamp cap has a smooth surface, and the electrically conductive sleeve includes a cylindrical conductive spring. Upper and lower ends of the conductive spring extend toward an axis respectively to form a fixing column. A mounting hole is opened at the bottom of the insertion portion, and a mounting groove is opened on the top of the lamp core column or the top of the insertion portion. The two fixing columns are respectively inserted into the mounting hole and the mounting groove. The first conductive wire is in electrical connection with either fixing column, and the conductive spring protrudes out of the outer sidewall of the waterproof insulation plastic lamp cap.

In a further technical solution, the electrically conductive sleeve and the conductive head are both made of a metallic conductive material, and the waterproof insulation plastic lamp cap is made of an insulation plastic material.

In a further technical solution, a drive element for driving the LED lamp filament is disposed on the first conductive wire or the second conductive wire, and the drive element is located inside or around the lamp core column.

In a further technical solution, the lamp core column is made of a glass material or a plastic material.

Compared with the prior art, the present invention may, after adopting the above structure, have the following advantages: the structure of the lamp bulb of the present invention is ingenious and suitable for mechanical automatic production and especially for automatic production of the lamp bulbs with waterproof insulation plastic lamp cap of various sizes. In this case, the production process will be simplified, and the production costs will be reduced greatly, thus effectively improving the daily production volume of the lamp bulbs. In the manner of inserting the lamp core into the lampshade, the cost pressure resulting from screwing-down assembly and manual assembly of the conventional multi-component lamp bulb can be reduced. By integral injection molding, the waterproof insulation plastic lamp cap is integrally formed on the insertion portion of the lampshade. Due to the high degree of injection molding, the unfinished lamp bulb can be fused into a lamp cap through a plastic fusion body. The waterproof insulation plastic lamp cap can be connected to a lamp bulb mounting base without needing a conventional metallic lamp cap, insulation sheet, and soldering, thus reducing the costs of multiple components. In other words, due to no need for a conventional metallic lamp cap and top sheet, the costs resulting from multiple components are reduced. Furthermore, the waterproof insulation plastic lamp cap is directly and integrally injection-molded on the lampshade, achieving seamless connection, high airtightness, increasing sealing insulation performance and waterproof performance of the lamp bulb, prolonging the service life of the lamp bulb, and further producing a beautiful and elegant appearance.

BRIEF DESCRIPTION OF THE DRAWINGS

The present invention will be further described below in combination with accompanying drawings and specific embodiments.

Numerals of drawings are described below:
1 lamp shade, 11 insertion portion, 12 mounting hole,
2 waterproof insulation plastic lamp cap, 21 thread,
31 electrically conductive sleeve, 32 conductive head, 33 lock-in part, 34 conductive column, 35 conductive spring, 36 fixing column,
4 lamp core body, 41 lamp core column, 42 mounting groove, 43 first conducive wire, 44 second conductive wire, 45 LED lamp filament, 46 drive element.

DETAILED DESCRIPTION OF PREFERRED EMBODIMENTS

The subsequent descriptions are made merely to preferred embodiments of the present invention and not meant to limit the scope of protection f the present invention.

Figure 1:
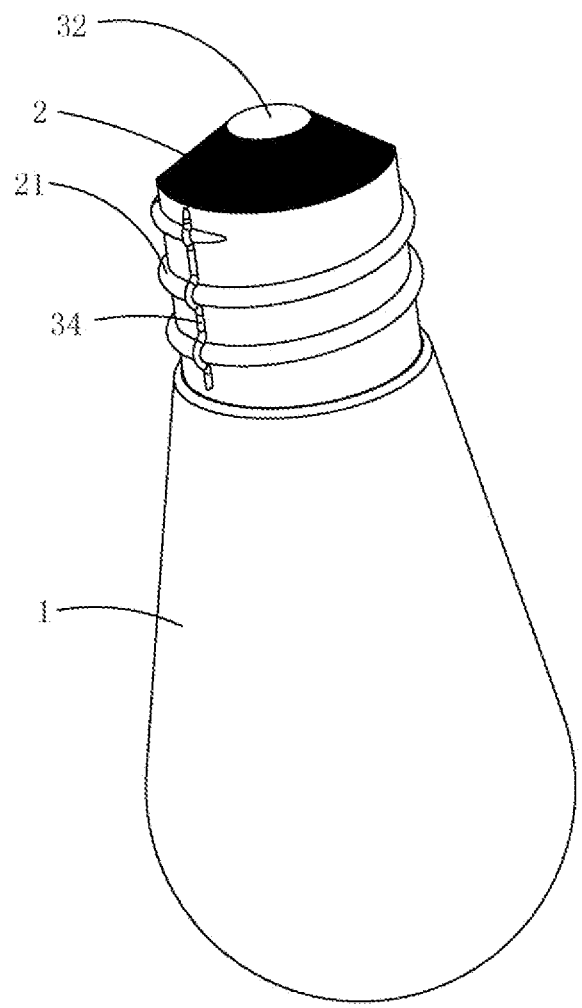
FIG. 1 is a structural schematic diagram illustrating a lock-in part adopted by an electrically conductive sleeve according to the present invention.
Figure 2:
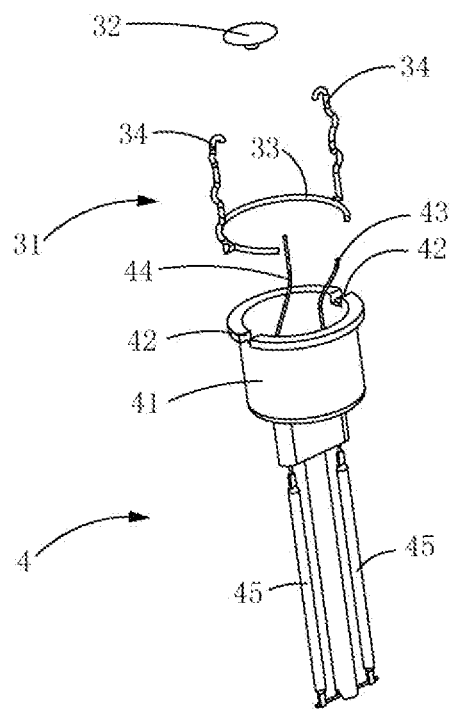
FIG. 2 is an exploded view illustrating a lock-in part adopted by an electrically conductive sleeve according to the present invention.
Figure 2:
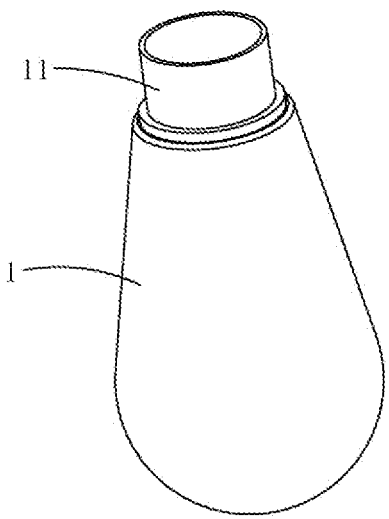
Figure 3:
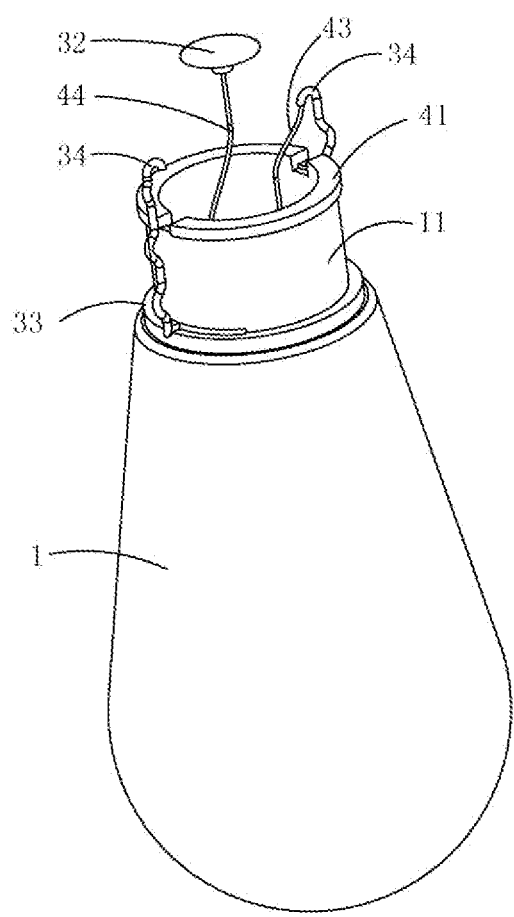
FIG. 3 is a structural schematic diagram illustrating a lock-in part adopted by an electrically conductive sleeve before being injection molded with a waterproof insulation plastic lamp cap.
Figure 4:
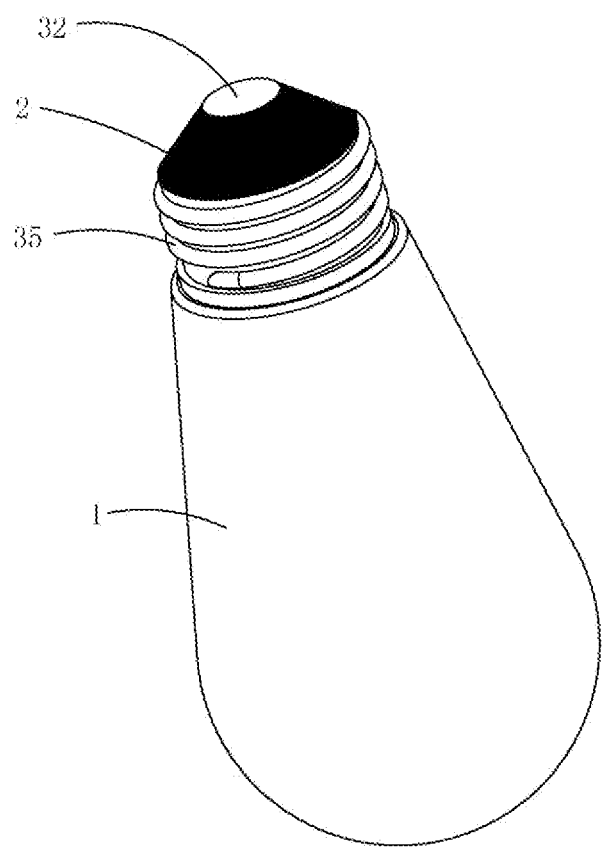
FIG. 4 is a structural schematic diagram illustrating a conductive spring adopted by an electrically conductive sleeve according to the present invention.
Figure 5:
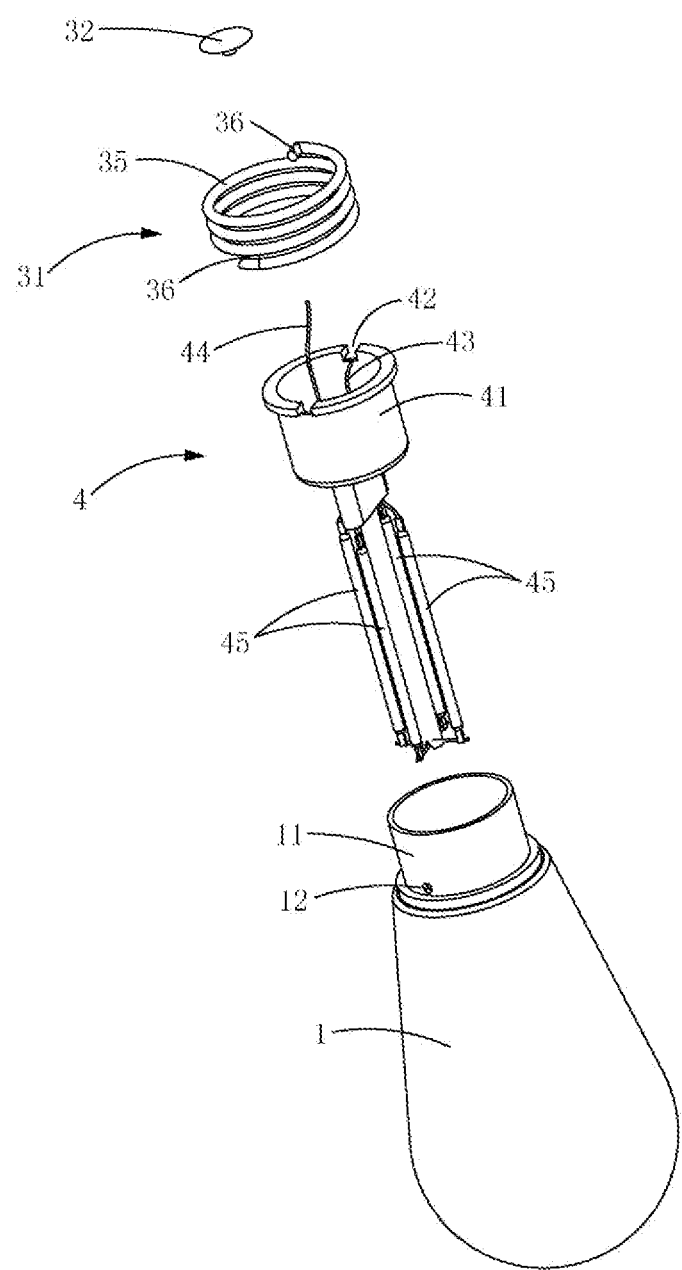
FIG. 5 is an exploded view illustrating a conductive spring adopted by an electrically conductive sleeve according to the present invention.
Figure 6:
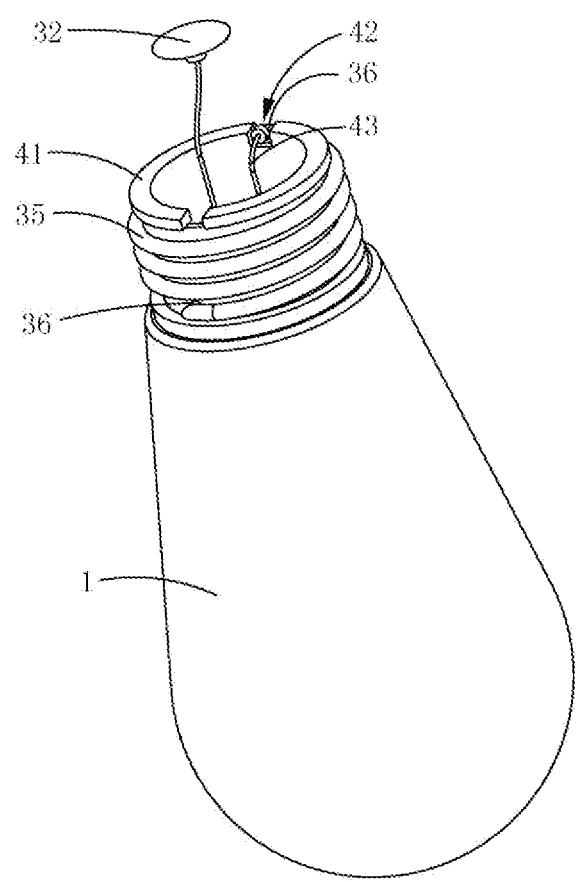
FIG. 6 is a structural schematic diagram illustrating a conductive spring adopted by an electrically conductive sleeve before being injection molded with a waterproof insulation plastic lamp cap according to the present invention.
Figure 7:
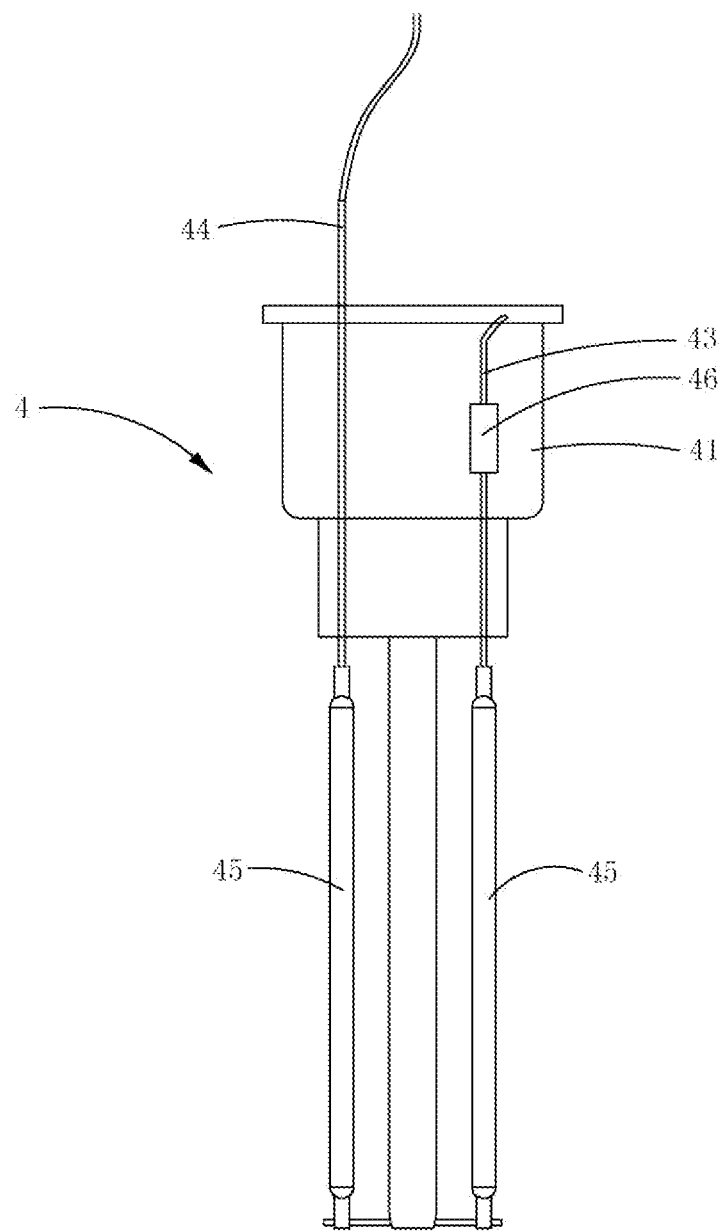
FIG. 7 is a structural schematic diagram illustrating a lamp core body according to the present invention.
Figure 8:
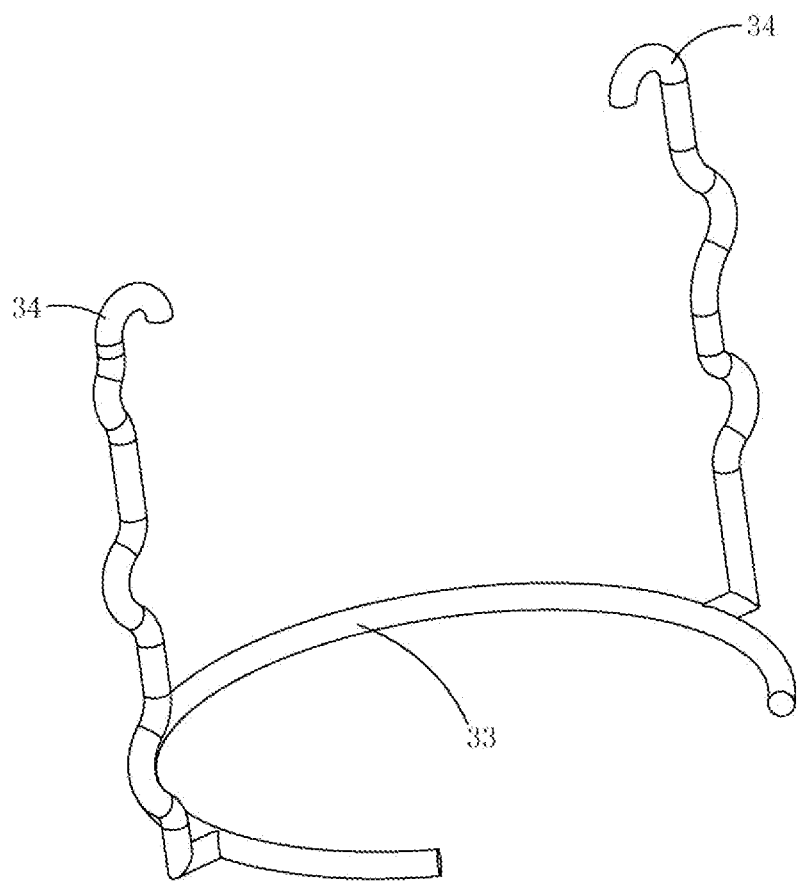
FIG. 8 is a structural schematic diagram illustrating a lock-in part according to the present invention.
Figure 9:
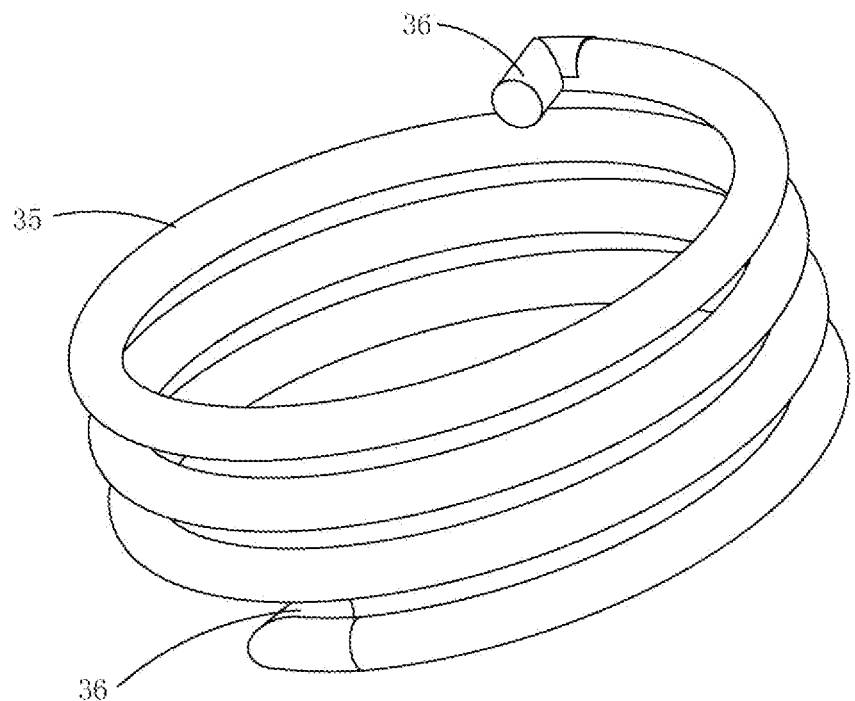
FIG. 9 is a structural schematic diagram illustrating a conductive spring according to the present invention.
Figure 10:
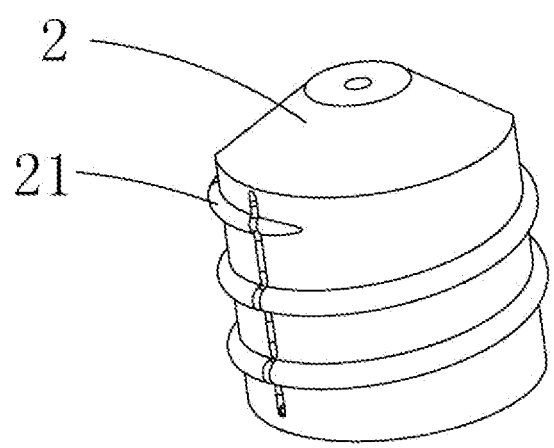
FIG. 10 is a structural schematic diagram of a waterproof insulation plastic lamp cap injection-molded with a lock-in part adopted by an electrically conductive sleeve according to the present invention.
Figure 11:
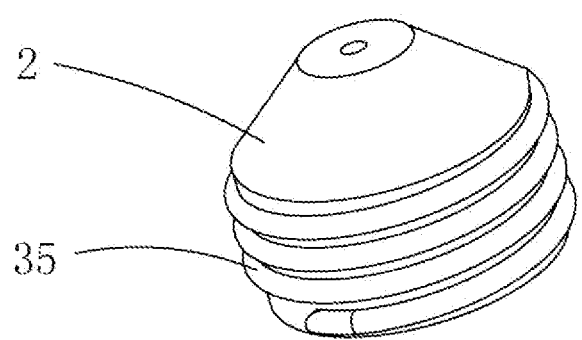
FIG. 11 is a structural schematic diagram of a waterproof insulation plastic lamp cap injection-molded with a conductive spring adopted by an electrically conductive sleeve according to the present invention.

There is provided a highly waterproof and highly insulative simple plastic lamp bulb without a conventional lamp cap. As shown in FIGS. 1-11, the lamp bulb includes a lampshade 1, a waterproof insulation plastic lamp cap 2, a conductive connection piece, and a lamp core body 4. An insertion portion 11 is provided at the bottom of lampshade 1, and the lamp core body 4 is inserted into insertion portion 11. The conductive connection piece is in electrical connection with the lamp core body 4, and the conductive connection piece is sleeved on the insertion portion 11 and the waterproof insulation plastic lamp cap 2 is injection-molded on the insertion portion 11. A conductive connection head is disposed on the top of the waterproof insulation plastic lamp cap 2, and the conductive connection piece protrudes out of the waterproof insulation plastic lamp cap 2.

The lamp core body 4 is inserted into the lampshade 1, the waterproof insulation plastic lamp cap 2 seals the lamp core body 4 in the lampshade 1, and then the waterproof insulation plastic lamp cap 2 and the lampshade 1 are integrally formed by injection molding to increase a connection strength between the waterproof insulation plastic lamp cap 2 and the lampshade 1. The exposed conductive connection piece is in electrical connection with an external power source, without needing to dispose an insulation apparatus around a positive pole contact at the bottom of the copper lamp cap to isolate the positive pole from a negative pole, which is what needs to be done for a traditional copper lamp holder, facilitating mechanized automatic production and especially the automatic production of the lamp bulbs with waterproof insulation plastic lamp cap of various sizes. In this case, the production process will be simplified, and the production costs will be reduced greatly, thus effectively improving the daily production volume of the lamp bulbs. Further, the cost pressure resulting from the manual assembly of the conventional multi-component lamp bulb can be reduced. Due to no need for a conventional copper lamp cap, the costs of multiple components are reduced. Furthermore, the waterproof insulation plastic lamp cap 2 is directly and integrally injection-molded on the lampshade 1, achieving seamless connection, high airtightness, increasing sealing insulation performance, and waterproof performance of the lamp bulb, and prolonging the service life of the lamp bulb.

The waterproof insulation plastic lamp cap 2 may be conveyed into a mold manually or mechanically to achieve integral injection molding.

Specifically, the conductive connection piece includes an electrically conductive sleeve 31, a conductive head 32. The electrically conductive sleeve 31 and the conductive head 32 are in electrical connection with the lamp core body 4 respectively. The electrically conductive sleeve 31 is sleeved on the insertion portion 11, the electrically conductive sleeve 31 protrudes out of an outer sidewall of the waterproof insulation plastic lamp cap 2, and the conductive head 32 protrudes out of the top of the waterproof insulation plastic lamp cap 2.

The electrically conductive sleeve 31 and the conductive head 32 serve as a positive pole contact and a negative pole contact respectively. When the waterproof insulation plastic lamp cap 2 is injection-molded, the electrically conductive sleeve 31 and the conductive head 32 are exposed outside the waterproof insulation plastic lamp cap 2, and then mounted on a conventional lamp holder with a thread or fitting buckle. The electrically conductive sleeve 31 and the conductive head 32 are electrically connected to a power supply line, eliminating the need for a conventional copper lamp cap and an insulation sheet disposed at the bottom of the copper lamp cap to isolate a positive pole and a negative pole. Thus, safety will be increased, the costs resulting from multiple components are reduced, and production flow is simplified, thus increasing the production volume.

Preferably, an outer side surface of the insertion portion 11 is provided with at least one sealing step. The sealing step increases a contact area with the waterproof insulation plastic lamp cap 2, thus blocking water entry, increasing sealing performance, and improving waterproofness. When the waterproof insulation plastic lamp cap 2 and the lampshade 1 are integrally formed by injection molding, the sealing step may also enable the waterproof insulation plastic lamp cap 2 to be connected with the lampshade in a buckling manner, thus further increasing a connection strength and a sealing performance.

Specifically, the lamp core body 4 includes a lamp core column 41, a first conductive wire 43, a second conductive wire 44, and at least one LED lamp filament 45. The lamp core column 41 is inserted into the insertion portion 11, and the LED lamp filament 45 is fixedly mounted on the lamp core column 41. One end of the first conductive wire 43 is in electrical connection with the LED lamp filament 45, and the other end of the first conductive wire 43 is in electrical connection with the electrically conductive sleeve 31. One end of the second conductive wire 44 is in electrical connection with the LED lamp filament 45, and the other end of the second conductive wire 44 is in electrical connection with the conductive head 32. The LED lamp filament 45 is series-connected between the first conductive wire 43 and the second conductive wire 44. The electrically conductive sleeve 31 and the conductive head 32 are connected with positive and negative currents respectively to form a circuit, such that the LED lamp filament 45 emits light. The LED lamp filament 45 features high lumen, low heat generation, no light attenuation, and long service life and the like, increasing the stability of the lamp bulb and prolonging it service life. Preferably, 2-4 LED lamp filaments 45 may be series-connected to increase its lumen.

Specifically, a thread 21 is integrally formed on the outer sidewall of the waterproof insulation plastic lamp cap 2, and the electrically conductive sleeve 31 includes a lock-in part 33 with an opening. The lock-in part 33 is sleeved on the bottom of the insertion portion 11. Two end portions of the lock-in part 33 vertically extend upward to form a wave-like conductive column 34 matched with thread 21 respectively. The conductive column 34 protrudes out of an outer sidewall of the thread 21, and the first conductive wire 43 is in electrical connection with either conductive column 34. The lock-in part 33 is fitted on the bottom of the insertion portion 11. After the waterproof insulation plastic lamp cap 2 is injection-molded, the conductive column 34 protrudes out of the waterproof insulation plastic lamp cap 2 and is shaped like a wave along the contour of the thread 21. The waterproof insulation plastic lamp cap 2 is thread-connected to a conventional lamp holder through thread 21 and the conductive column 34 is in electrical connection with a power supply contact on the lamp holder.

Specifically, the outer sidewall of the waterproof insulation plastic lamp cap 2 has a smooth surface, and the electrically conductive sleeve 31 includes a cylindrical conductive spring 35. The upper and lower ends of the conductive spring 35 extend toward an axis respectively to form a fixing column 36. A mounting hole 12 is opened at the bottom of the insertion portion 11, and a mounting groove 42 is opened on the top of the lamp core column 41 or the top of the insertion portion 11. The two fixing columns 36 are respectively inserted into the mounting hole 12 and the mounting groove 42. The first conductive wire 43 is in electrical connection with either fixing column 36, and the conductive spring 35 protrudes out of the outer sidewall of the waterproof insulation plastic lamp cap 2. The electrically conductive sleeve 31 may adopt a cylindrical conductive spring 35. When the waterproof insulation plastic lamp cap 2 is injection-molded, the conductive spring 35 is exposed. In this case, the conductive spring 35 can serve as a thread 21 to connect with the conventional lamp holder as well as supply power from the conventional lamp holder, thus achieving a higher degree of integration.

Specifically, the electrically conductive sleeve 31 and the conductive head 32 are both made of a metallic conductive material, and the waterproof insulation plastic lamp cap 2 is made of an insulation plastic material.

Specifically, a drive element 46 for driving the LED lamp filament 45 is disposed on the first conductive wire 43 or the second conductive wire 44, and the drive element 46 is located inside or around the lamp core column 41. An exhaust tube extending externally is provided inside the lamp core column 41. The drive element 46 is disposed in a space in the lamp core column 41 for the purpose of protection, and the exhaust tube is used to perform vacuumization. After vacuumization is completed, the exhaust tube should be sealed up to maintain a vacuum state. Thus, the position of fusion of the exhaust tube can be kept airtight, increasing the product quality, and reducing the failure rate.

Specifically, the lamp core column 41 is made of a glass material or a plastic material. When the lamp core column 41 is made of a glass material, the first conductive wire 43, the second conductive wire 44, and the lamp core column 41 can be integrally connected by performing high-temperature sintering on the top of the lamp core column 41. In this way, during an automatic or manual production, the position of the lamp core body 4 can be fixed, thus increasing the qualification rate of the products. When the lamp core column 41 is made of plastic material, the core column 41 is integrally formed, and the end of the core column 41 is provided with a fixing groove, and the first conductive wire 43 and the second conductive wire 44 are electrically connected by a metal conductive wire. the metal conductive wire is fixed in the fixing groove so that the first conductive wire 43, the second conductive wire 44, and the lamp core column 41 are linked together.

The above descriptions are merely made to the preferred embodiments of the present invention. Those skilled in the art may make any change to the specific embodiments and their application scope based on the idea of the present invention. The contents of the present specification shall not be understood as limiting of the present invention.

I claim:

1. A plastic lamp bulb, comprising a lampshade, a waterproof insulation plastic lamp cap, a conductive connection piece, and a lamp core body, wherein an insertion portion is provided at the bottom of the lampshade, the lamp core body is inserted into the insertion portion, the conductive connection piece is in electrical connection with the lamp core body, the conductive connection piece is disposed on the insertion portion and then integrally injection-molded into the waterproof insulation plastic lamp cap in a sealed manner, a conductive connection head is disposed on the top of the waterproof insulation plastic lamp cap, the conductive connection piece protrudes out of the waterproof insulation plastic lamp cap, the conductive connection piece comprises an electrically conductive sleeve and the conductive connection head, the electrically conductive sleeve and the conductive connection head are in electrical connection with the lamp core body respectively, the electrically conductive sleeve is sleeved on the insertion portion, the electrically conductive sleeve protrudes out of an outer sidewall of the waterproof insulation plastic lamp cap, the conductive connection head protrudes out of the top of the waterproof insulation plastic lamp cap, the lamp core body comprises a lamp core column, a first conductive wire, a second conductive wire, and at least one LED lamp filament, the lamp core column is inserted into the insertion portion, the LED lamp filament is fixedly mounted on the lamp core column, one end of the first conductive wire is in electrical connection with the LED lamp filament, the other end of the first conductive wire is in electrical connection with the electrically conductive sleeve, one end of the second conductive wire is in electrical connection with the LED lamp filament, the other end of the second conductive wire is in electrical connection with the conductive connection head, a thread is integrally formed on the outer sidewall of the waterproof insulation plastic lamp cap, the electrically conductive sleeve comprises a lock-in part with an opening, the lock-in part is sleeved on the bottom of the insertion portion, two end portions of the lock-in part vertically extend upward to form a wave-like conductive column matched with the thread respectively, the conductive column protrudes out of an outer sidewall of the thread, and the first conductive wire is in electrical connection with the conductive column.

2. The plastic lamp bulb of claim 1, wherein the electrically conductive sleeve and the conductive connection head are both made of a metallic conductive material, and the waterproof insulation plastic lamp cap is made of an insulation plastic material.

3. The plastic lamp bulb of claim 1, wherein a drive element for driving the LED lamp filament is disposed on the first conductive wire or the second conductive wire, and the drive element is located inside or around the lamp core column.

4. The plastic lamp bulb of claim 3, wherein the lamp core column is made of a glass material or a plastic material.

5. The plastic lamp bulb of claim 1, wherein the lamp does not contain a metal lamp holder.

6. A plastic lamp bulb comprising a lampshade, a waterproof insulation plastic lamp cap, a conductive connection piece, and a lamp core body, wherein an insertion portion is provided at the bottom of the lampshade, the lamp core body is inserted into the insertion portion, the conductive connection piece is in electrical connection with the lamp core body, the conductive connection piece is disposed on the insertion portion and then integrally injection-molded into the waterproof insulation plastic lamp cap in a sealed manner, a conductive connection head is disposed on the top of the waterproof insulation plastic lamp cap, the conductive connection piece protrudes out of the waterproof insulation plastic lamp cap, the conductive connection piece comprises an electrically conductive sleeve and the conductive connection head, the electrically conductive sleeve and the conductive connection head are in electrical connection with the lamp core body respectively, the electrically conductive sleeve is sleeved on the insertion portion, the electrically conductive sleeve protrudes out of an outer sidewall of the waterproof insulation plastic lamp cap, the conductive connection head protrudes out of the top of the waterproof insulation plastic lamp cap, the lamp core body comprises a lamp core column, a first conductive wire, a second conductive wire, and at least one LED lamp filament, the lamp core column is inserted into the insertion portion, the LED lamp filament is fixedly mounted on the lamp core column, one end of the first conductive wire is in electrical connection with the LED lamp filament, the other end of the first conductive wire is in electrical connection with the electrically conductive sleeve, one end of the second conductive wire is in electrical connection with the LED lamp filament, the other end of the second conductive wire is in electrical connection with the conductive connection head, the outer sidewall of the waterproof insulation plastic lamp cap has a smooth surface, the electrically conductive sleeve comprises a cylindrical conductive spring, and upper and lower ends of the conductive spring extend toward an axis respectively to form a fixing column, a mounting hole is opened at the bottom of the insertion portion, a mounting groove is opened on the top of the lamp core column or the top of the insertion portion, the two fixing columns are respectively inserted into the mounting hole and the mounting groove, the first conductive wire is in electrical connection with either fixing column, and the conductive spring protrudes out of the outer sidewall of the waterproof insulation plastic lamp cap.

7. The plastic lamp bulb of claim 6, wherein the electrically conductive sleeve and the conductive connection head are both made of a metallic conductive material, and the waterproof insulation plastic lamp cap is made of an insulation plastic material.

8. The plastic lamp bulb of claim 6, wherein a drive element for driving the LED lamp filament is disposed on the first conductive wire or the second conductive wire, and the drive element is located inside or around the lamp core column.

9. The plastic lamp bulb of claim 8, wherein the lamp core column is made of a glass material or a plastic material.

10. The plastic lamp bulb of claim 6, wherein the lamp does not contain a metal lamp holder.

* * * * *